United States Patent [19]

McElreath

[11] Patent Number: 4,740,899

[45] Date of Patent: Apr. 26, 1988

[54] USE OF HEADWIND AND AIRSPEED TO ACHIEVE A TRANSITION TO A HOVER IN A HELICOPTER OR VTOL AIRCRAFT

[75] Inventor: Kenneth W. McElreath, Cedar Rapids, Iowa

[73] Assignee: Rockwell International Corporation, El Segundo, Calif.

[21] Appl. No.: 394,361

[22] Filed: Jul. 1, 1982

[51] Int. Cl.$^4$ .............. G06G 7/70; G05D 1/00; B64C 11/44; G06F 15/50

[52] U.S. Cl. .................. 364/434; 73/178 R; 73/178 H; 244/17.13; 244/182; 244/183; 364/426; 364/428; 364/432; 364/433; 364/565

[58] Field of Search ........... 364/426, 428, 432, 433, 364/434, 565; 340/949, 969, 978; 244/17.13, 175, 180, 182, 183, 186, 190, 193; 73/78 R, 78 H

[56] References Cited

U.S. PATENT DOCUMENTS

| | | | |
|---|---|---|---|
| 3,916,688 | 11/1975 | Dendy et al. | 364/428 |
| 3,927,306 | 12/1975 | Miller | 244/186 |
| 4,004,756 | 1/1977 | Gerstein et al. | 364/434 |
| 4,005,835 | 2/1977 | Gerstine et al. | 364/432 |
| 4,029,271 | 6/1977 | Murphy et al. | 244/180 |
| 4,106,093 | 8/1978 | Grimm et al. | 244/182 |
| 4,133,503 | 1/1979 | Bliss | 244/188 |
| 4,213,584 | 7/1980 | Tefft et al. | 244/17.13 |
| 4,277,041 | 7/1981 | Marrs et al. | 244/182 |
| 4,357,663 | 11/1982 | Robbins et al. | 244/182 |
| 4,382,283 | 5/1983 | Clelford et al. | 364/434 |

Primary Examiner—John W. Caldwell, Sr.
Assistant Examiner—D. Angotti
Attorney, Agent, or Firm—George A. Montanye; Robert C. Mayes; H. Fredrick Hamann

[57] ABSTRACT

An improved system and technique is disclosed which enables an aircraft control system to bring an aircraft to hover with no direct measurement of ground speed. The system includes a device for numerically calculating a value for ground speed based on a differentiation of aircraft position as measured from conventional ground reference navigational aids. The computed value of ground speed is compared with values representing heading and true air speed to generate a computed value of wind. The computed value of wind is then resolved into vector components of headwind and crosswind and the headwind component and air speed are summed to provide a signal used to control aircraft speed until zero ground speed is achieved.

14 Claims, 1 Drawing Sheet

USE OF HEADWIND AND AIRSPEED TO ACHIEVE A TRANSITION TO A HOVER IN A HELICOPTER OR VTOL AIRCRAFT

BACKGROUND OF THE INVENTION

The present invention relates to aircraft control systems and techniques and more particularly to a system for controlling the ground speed of an aircraft to produce hovering of the aircraft.

In aircraft control systems of the prior art, it has often been desirable to reduce ground speed to zero during flight to permit aircraft hovering, particularly in helicopter and VTOL aircraft. In order to accomplish aircraft hovering, a measurement of ground speed is first made using a unit such as a Doppler radar or inertial system to specifically measure the ground speed. The value for ground speed is then coupled to the flight control system in the aircraft which reduces the velocity of the aircraft until the measured value for ground speed equals zero. Normally this is accomplished by controlling the trim angle on the rotor of the helicopter, for example, to change its pitch attitude and thereby controlling its speed. In systems of this type, the pitch attitude is changed until the helicopter ground speed is brought to zero, thereby maintaining a hover condition.

One of the disadvantages of such prior art systems has been the cost required to include apparatus for directly measuring aircraft ground speed. Doppler radar, for example, may make the required ground speed measurements but is costly and also significantly increases the weight and space requirements of the aircraft. Inertial systems likewise provide a direct measurement of ground speed but are also expensive and heavy and decrease the versatility of the aircraft and its use in certain environments. In new generation helicopters and VTOL aircraft, space, weight and cost considerations are critical to the effective marketing and operation in their intended fields.

In spite of the above deficiencies, there is still a great need in helicopter and VTOL aircraft to include measurements of ground speed in order to allow automatic control of present day aircraft. There is also a continuing effort to provide completely automatic aircraft control by use of an autopilot for automatic takeoff, landing and hovering of the aircraft. Since some measurement related to groundspeed is necesary to produce the control required to achieve hover, there has been no alternative but to provide expensive and complex equipment to make that measurement. There is therefore a need for systems and techniques which allow an aircraft to achieve a hover condition for landing in restricted environments.

The present invention has been developed to provide a technique for enabling hover without a direct measurement of ground speed and to overcome the limitations of the above known and similar techniques.

SUMMARY OF THE INVENTION

In accordance with the inventive system and technique, an aircraft system includes a navigation computer which receives input from various navigational aids including ground based referenced LORAN, VOR/TACAN, Omega, and others, and flight information including airspeed, heading, and other environmental measurements. The navigation computer calculates the position of the aircraft during sample time periods and based upon the change in position with respect to time, produces a ground speed estimate. The ground speed estimate is compared with readings from the heading and true air speed to continuously generate a computed wind value. This computed wind value is resolved into aircraft related components, namely the headwind and crosswind. The signal representing headwind and a signal representing longitudinal airspeed are then combined to produce an error signal which is driven to zero when the longitudinal airspeed equals the headwind, thereby indicating a hover condition. The airspeed error output is utilized to decrease airspeed until the error signal is zero. This technique enables an automatic or selected transition from flight to hover without the necessity of a direct measurement of ground speed. Alternatively, the computed value for headwind can be pilot- selected or automatically transmitted from a weather station as a value for comparison with the longitudinal airspeed signal.

It is therefore a feature of the invention to provide an aircraft control system which enables control of airspeed to produce hover.

It is a further feature of the invention to provide an aircraft control system which is capable of reducing aircraft ground speed to zero without a direct measurement of ground speed.

Still another feature of the invention is to provide a system for enabling aircraft transition from a flight condition to a hover condition based only on position and airspeed information.

A further feature of the invention is to provide headwind information in an aircraft control system for use in calculating and controlling aircraft velocity to produce a hover condition.

Still a further feature of the invention is to provide a technique which allows automatic control of aircraft velocity to accomplish a condition of zero ground speed without a direct measurement of that ground speed.

These and other advantages and novel features of the invention will become apparent from the following detailed description when considered with the accompanying drawings wherein:

DETAILED DESCRIPTION OF A PREFERRED EMBODIMENT

Figure 1:
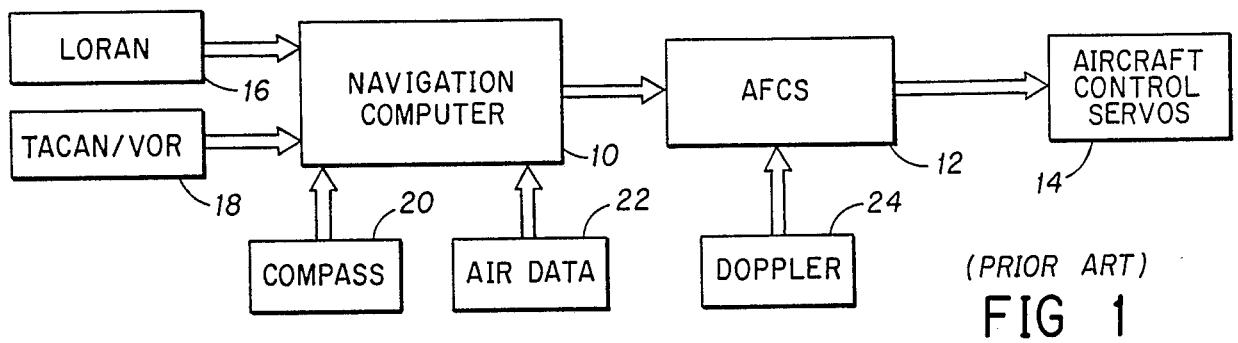
FIG. 1 is a schematic block diagram showing an aircraft control system of the prior art using a direct measure of ground speed for performing transition of aircraft flight to hover.

Referring first to FIG. 1, wherein like numerals are used to refer to like elements throughout, a prior art aircraft control system is shown which generally includes a navigation computer 10 which couples information to an automatic flight control system 12 (AFCS) which in turn controls aircraft servos 14 to control the characteristics of aircraft flight based on inputs to the navigation computer 10. Navigation computer 10 may have a variety of conventional inputs based on ground reference navigational aids including LORAN signals from 16, TACAN/VOR signals from 18, compass signals from 20, and air data input from 22. Each of these inputs is used by the navigation computer to control course, airspeed, heading and other aircraft parameters and to provide appropriate displays for pilot control in connection with those measured quantities. The navigation computer 10 provides its outputs to an automatic flight control system which in turn uses the information to control the characteristics of aircraft flight automatically through operation of the aircraft control servos 14. In prior art systems, in order to have an automatic or pilot controlled approach to hover, it was necessary for a Doppler 24 or other device capable of measuring ground speed, to provide a measurement of that ground speed to the automatic flight control system, to control aircraft velocity through servos 14 so that the ground speed output from Doppler 24 went to zero. When the zero ground speed condition was attained the aircraft velocity was such as to maintain hover.

As was previously mentioned, the above known techniques enable automatic and manual transition to hover from a flight condition, but require expensive and cumbersome devices for directly measuring ground speed. In addition, devices such as the Doppler, while providing the necessary ground speed measurements, may be inaccurate at specific times due to adverse weather conditions and the terrain over which such devices are used. In those particular instances, errors in the ground speed indication can prevent smooth and controlled maintenance of the hover condition when accuracy is most desirable. In view of the trend toward aircraft control which will allow automatic landing and flight in all weather conditions and over all terrain, it becomes even more critical to provide control techniques which will allow more accurate and automatic flight control.

Figure 2:
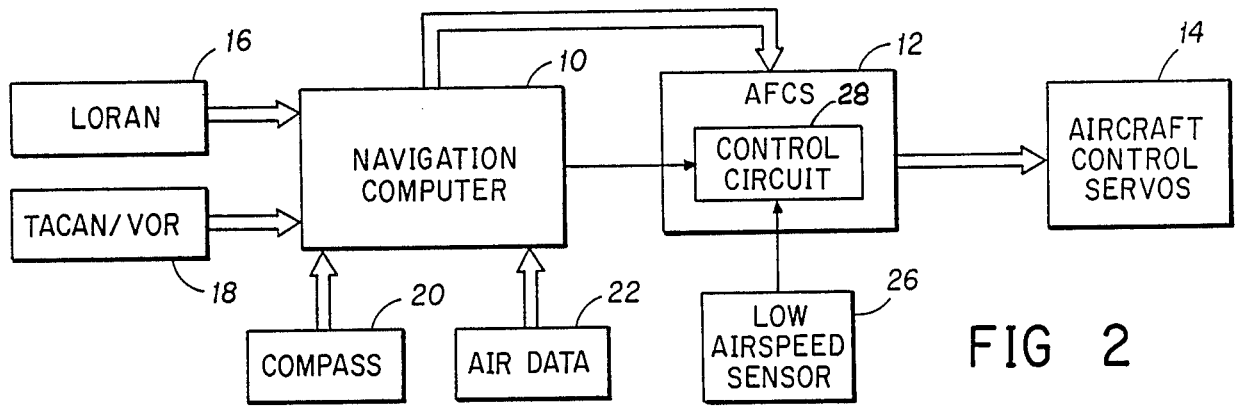
FIG. 2 is a schematic block diagram showing the system of the present invention for controlling the transition from flight to hover without a direct measure of ground speed.

In accordance with the above, the inventive system of FIG. 2 has been developed which allows the transition from flight to hover by controlling aircraft velocity based on longitudinal airspeed and a value of headwind. In this example, the navigation computer 10 again receives inputs from various ground reference navigational aids including the LORAN 16, TACAN/VOR 18, compass 20, air data 22 and others, and is capable of making various computations with respect thereto. In this particular instance, the navigation computer 10 may be easily programmed using conventional mathematical techniques to compute a value for ground speed using the inputs for aircraft position from the navigational aids. In particular, the navigational aids provide an indication of aircraft position and if this position is measured with respect to another position at predetermined intervals, on a continuous basis, ground speed may be estimated by calculating the change in position with respect to time. At the same time the navigation computer 10 also receives heading and true air speed information from the various sensor inputs.

Using known mathematical relationships, the heading and true air speed may be used to compute a value which when subtracted from the computed value of ground speed gives a computed vector value for wind. This value may then be resolved (by mathematical computation in the computer) into its vector components of crosswind and headwind also using common mathematical relationships with respect to aircraft heading. The computed value of headwind is then provided as an output from the navigation computer 10. An output for longitudinal airspeed is also provided from a conventional low airspeed sensor 26 in the aircraft. These two outputs are combined in a control circuit 28 to produce an error signal which is used by the AFCS 12 to drive aircraft control servos 14 so that the velocity of the aircraft decreases from its flight velocity to a longitudinal airspeed equal and opposite to the value of headwind. At this point, the error signal from the combined signals of headwind and longitudinal airspeed will be zero, and the aircraft will have attained a hover condition at zero ground speed. Normally, the lateral position of the aircraft is controlled by position information from the navigation computer 10 and AFCS 12. However, the crosswind and lateral airspeed could be used in a manner similar to that described above to provide zero lateral groundspeed if desired.

As an alternative to the use of the computed value of headwind as an output from navigation computer 10, the navigation computer 10 could receive as input, a digital or analog value preselected by the pilot and representative of a specific headwind based upon a measured or reported wind at or near the site of the intended approach to hover. While this measurement might be less precise than a value of wind based on the determination of ground speed computed from the navigational aids, it would still provide a technique for allowing an automatic transition from flight to hover without a direct measurement of the ground speed. In either case, the more costly and complex equipment required to directly measure ground speed would not be required.

Figure 3:
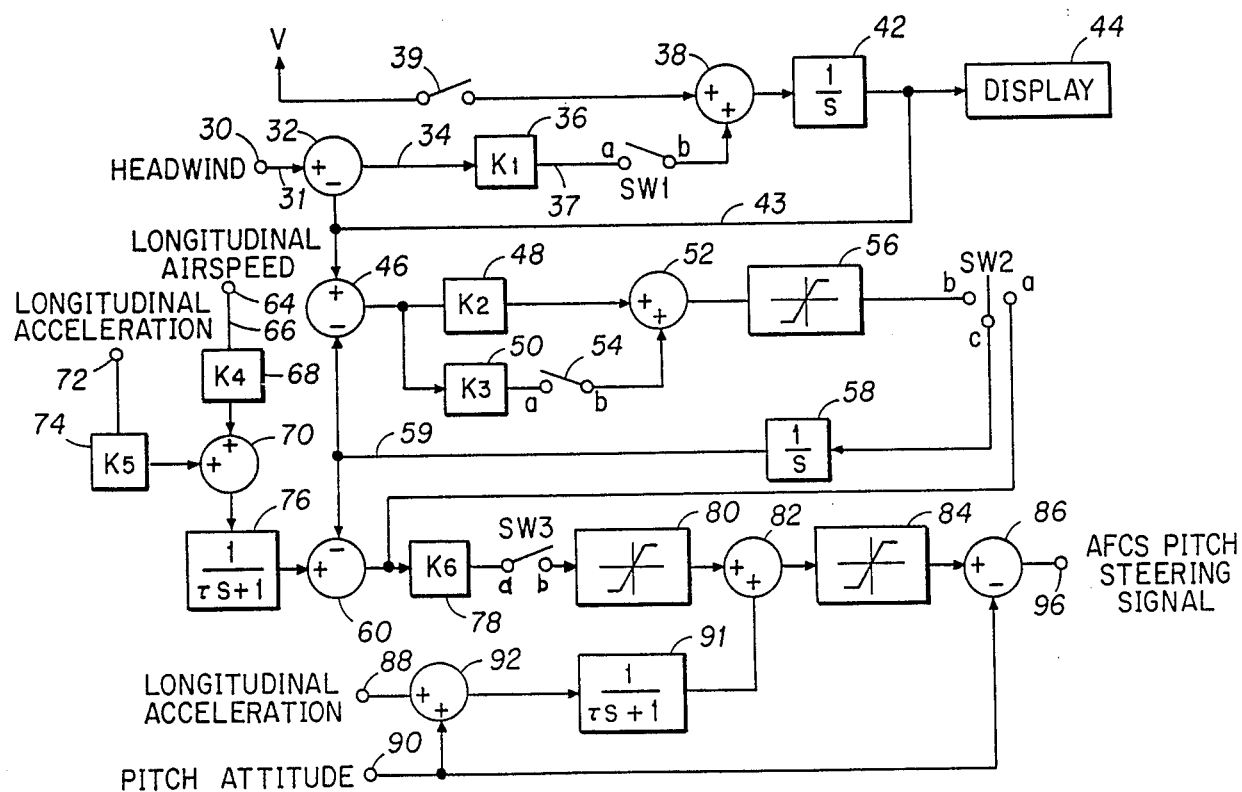
FIG. 3 is a schematic diagram showing the control system in more detail for automatically accomplishing the transition from flight to hover.

Referring now to FIG. 3, there is shown a more detailed diagram of the control circuit 28 which combines the signal representing headwind and the signal representing longitudinal airspeed to produce an error signal driving aircraft velocity such that the longitudinal airspeed equals headwind. More specifically, the headwind signal is provided from navigation computer 10 or, as previously mentioned, from pilot input of an indication of headwind at or near the hover site. The headwind signal is coupled to input terminal 30 and through line 31 to the positive input of summing circuit 32. The output from summing circuit 32 is coupled through line 34 and through an amplifier 36 with a constant gain K1. The output from amplifier 36 is coupled via line 37 to switch SW1 which may be operated to a closed position to electrically coupled terminals a and b. Switch terminal b is coupled to one input of a summing circuit 38 while a fixed signal produced by closing slew switch 39 is coupled as the second input to summing circuit 38 and added to the signal produced at terminal b of switch SW1. The output of summing ciruit 38 is coupled to an integrator 42 which in turn has its output coupled as input to display 44 and through line 43 to the negative input of summing circuit 32 for subtraction from the signal provided over line 31. The display 44 may be of any conventional type such as an LCD, LED or meter movement which is capable of displaying the signal value at the output of integrator 42.

When the headwind signal is received at input 30, while the switch SW1 is closed, a signal is produced at the negative input to summing circuit 32 which is equal to the value for headwind 30. When the switch SW1 is opened the signal at the output of integrator 42 is stored and provided as the positive input to summing circuit 46. During the time the switch SW1 is open and the integrator 42 is providing its stored output on line 43, the output will be displayed by display 44. The output on line 43 may be modified by closing slew switch 39 to provide additional input from voltage source V to the integrator 42. Thus, by selectively controlling the time which the voltage V is applied to summing circuit 38, the value of the speed command provided at the output of integrator 42 may be manually increased or decreased for modifying the stored headwind signal.

The output from summing circuit 46 is coupled as input to two parallel connected amplifiers 48 and 50 having constant gains K2 and K3, respectively. The output of amplifier 48 is coupled as one input to summing circuit 52 while the output from amplifier 50 is coupled through a slew switch 54 (the same pilot activation as switch 39) and added as a second input to summing circuit 52. The output of summing circuit 52 is coupled to a limiting circuit 56 and thence to terminal b of switch SW2 having terminals a and b and common terminal c. Terminal c of switch SW2 is coupled to integrator 58 which has its output coupled as the negative input to summing circuits 46 and 60 through line 59, for subtraction from the signals at the other inputs to summing circuits 46 and 60. Terminal a of switch SW2 is coupled through line 62 to the output of summing circuit 60.

The measurement for longitudinal airspeed is made by a conventional low airspeed sensor 26 and is provided as an input signal to terminal 64. The signal from 64 is coupled via line 66 to an amplifier 68 having a constant gain K4 and having its output coupled to summing circuit 70. A signal representing longitudinal acceleration is also coupled from terminal 72 through amplifier 74, having a constant gain K5, and added to the output from 68 through a second input to summing circuit 70. The signal for longitudinal acceleration can be conventionally obtained from other aircraft sensors and provided to terminal 72 to modify the signal for longitudinal airspeed as well known in the art. The output of summing circuit 70 is coupled through filter 76 to the positive terminal of summing circuit 60. The output of summing circuit 60 is coupled through amplifier 78, having a constant gain K6, to terminal a of switch SW3. Terminal b of switch SW3 is coupled via limiter 80 to an input of summing circuit 82. The output of summing circuit 82 is then coupled through a second limiter 84 and thence to the positive input of summing circuit 86.

The signal indicative of longitudinal acceleration is also coupled from the conventional aircraft sensor to input terminal 88 while another signal indicative of pitch attitude is coupled from conventional sensing circuits to input terminal 90. The longitudinal acceleration signal at terminal 88 is coupled as one input to summing circuit 92 where it is added with the pitch attitude signal and coupled as a second input to summing circit 92. The pitch attitude signal is also coupled to the negative input to summing circuit 86 where it is subtracted from the signal input from limiter 84. The output of summing circuit 92 is coupled through filter 91 and then added to the signal output from limiter 80 through the second input to summing circuit 82. The output 96 of the summing circuit 86 then represents a pitch steering signal which is transmitted by the AFCS 12 to control pitch attitude and therefore forward velocity of the aircraft.

The operation of the circuit in performing the transition from flight to hover will now be described with respect to FIG. 3. Initially, switch SW1 is closed coupling terminals a and b, switch SW3 is opened so that there is no electrical coupling between terminals a and b, and switch SW2 is operated to couple terminals a and c. At this time, the aircraft may be in flight and, as is apparent, the output from switch SW3 will not be used to control aircraft velocity. Other automatic systems may be used to to control aircraft velocity or the pilot may control aircraft velocity through the normal stick manipulation. Nevertheless, signals representing headwind and longitudinal airspeed will be provided to input terminals 30 and 64 respectively from navigation computer 10 (or pilot input) and airspeed sensor 26.

The signal representing headwind at terminal 30 will circulate in the loop including summing circuits 32 and 38 and integrator 42 to provide an output on line 43 representing the value for headwind. At the same time, the longitudinal airspeed at terminal 64 as modified by the longitudinal acceleration at input 72 (through summing circuit 70) will be coupled to summing circuit 60. With switch SW2 operated to a position coupling terminals a and c, the output from summing circuit 60 will be coupled to integrator 58 (through line 62) to produce a signal representing longitudinal airspeed on line 59 which is equal to that of the positive input to summing circuit 60 from filter 76.

When it is desired to control the aircraft so that it makes a transition from flight to a hover condition, switch SW1 is opened, switch SW3 is closed to electrically couple terminals a and b and switch SW2 is operated to electrically couple its terminals b and c. At this time, the signal representing headwind at the input of terminal 30 is stored at the output of integrator 42 and is provided as the headwind signal on line 43. At the same time, the value for the current longitudinal airspeed is stored by integrator 58 and provided as a signal on line 59. As will be understood, if the aircraft is in a constant velocity flight, at the time that switches SW1, SW2 and SW3 are switched as described, the longitudinal acceleration will be zero and the output on line 59 will be a direct representation of longitudinal airspeed.

After the switches have been moved the signal for longitudinal airspeed provided on line 59 is subtracted from the headwind signal on line 43 through the loop including summing circuits 46 and 52, limiting circuit 56 and integrator 58. The loop acts to gradually fade the signal at 59 so that there is not an abrupt signal change at the output of summing circuit 60. Thus, the signal on 59 will be subtracted from the signal on 43 as controlled by the circuits 46, 52, 56 and 58 to produce a gradually decreasing signal as input to the negative terminal of summing circuit 60. The limiting circuit 56 controls the profile which determines the rate at which the signal at the negative input of 60 decays to the signal value for headwind on line 43.

The output of summing circuit 60, which is initially a gradually increasing error signal, is coupled through limiters 80 and 84 as the positive input to summing circuit 86 so that the output of 86 reflects the error between headwind and longitudinal airspeed and dictates the pitch steering command needed to change longitudinal airspeed. The pitch steering signal at the output 96 is modified in a conventional manner by combining the output of summing circuit 60 with longitudinal acceleration and pitch attitude signals in a conventional manner. Thus, longitudinal acceleration as modified by pitch attitude in summing circuit 92 is first added in summing circuit 82 to modify the error signal from summing circuit 60. The output from circuit 82 is further modified by pitch attitude which is subtracted from the output of limiter 84 in summing circuit 86 to produce the pitch steering command signal at output 96. The effect of the modifications by longitudinal acceleration and pitch attitude is well known and a detailed explanation of their implementation to modify the error signal from summing circuit 60 is unnecessary to a further understanding of the invention. The circuit as described, however, allows a reading for headwind to be stored by opening switch SW1 and this value then provides the output signal on line 43 which is used to control the transition from flight to hover. The pitch steering command signal at 96 causes changes in aircraft airspeed until the output at summing circuit 60 is zero representing zero ground speed at hover.

As can be seen and understood from the above description, if a new value for headwind is desired at any time during the transition from flight to hover, the switch SW1 may be momentarily closed to couple terminals a and b so that the value at input terminal 30 is read and provided at the output of integrator 42 on line 43. This value may then be stored by again opening switch SW1. Alternatively, the hover speed command at the output of integrator 42 as provided on line 43 may be modified by slew switch 39 by manually incrementing or decremating the value stored at the output of integrator 42. This may be done by the pilot while viewing the signal readout on display 44 representing hover speed command. When the pilot activates slew switch 39, switch 54 also closes to decrease the response time of the aircraft to a pilot speed slew input.

By utilizing switch SW2 and integrator 58 to initially store a value for longitudinal airspeed, the signal at the negative input of summing circuit 60 at first appears equal to the longitudinal airspeed when switch SW3 is moved to couple terminals b and c. Thereafter, the initial value for longitudinal airspeed as seen on line 59 is subtracted from the stored value on line 43 in the discharge loop including elements 46, 52, 56 and 58, to cause a controlled decay of the signal from the value representing longitudinal airspeed to the value representing headwind.

As the signal on 59 changes from the stored longitudinal airspeed to the stored value for headwind on line 43, the output from summing circuit 60 (as modified by the longitudinal acceleration and pitch attitude) causes a pitch steering signal at 96 which gradually controls airspeed to produce a zero error signal at 96. Thus, the input at the negative input of summing circuit 60 does not immediately cause a large error signal output at 96 necessitating an abrupt and significant change in the velocity, but rather causes a more natural and controlled decrease of longitudinal airspeed to produce a zero error signal output from summing circuit 60 and thereby decrease ground speed to zero for the hover condition. This condition may be easily modified by the pilot as previously mentioned by instantaneous inputs through slew switch 39 during the transition from flight to hover or by operation of switch SW1 to update headwind information during the approach to hover.

In an exemplary embodiment of the invention, the following values were used for K1–K6:
K1=100
K2=0.333
K3=0.667
K4=1.67
K5=3.2
K6=0.32

Also, the value for $\tau$ in element 76 was 4 and the value for $\tau$ in element 91 was 5. Each of these values are examples of those which may be used, it being understood that the same may be varied in accordance with known techniques to achieve operation of the above system as described.

As can be seen from the above description, the invention provides an improved system for calculating ground speed and providing information for achieving a transition from flight to hover without a direct measure of that ground speed. The system is less expensive and less complex and enables aircraft control in all weather conditions and over various terrains. Use of the system and technique allows improved aircraft performance without undue complexity and cost. All of these are advantages that are not recognized or shown in the prior art.

While the invention has been described with reference to specific components, it is obvious that other elements could be used to perform the calculations and combination of signals as previously described. The navigation computer and automatic flight control system, for example, could be replaced with any system capable of calculating the desired values and providing aircraft control in response to those values. Additionally, while it is desirable that the controlled airspeed follow a programmed acceleration or deceleration profile to enable a transition from flight to hover, the particular profile may be altered without detracting from the teachings of the present technique. Likewise, the specific servos and control loops used to control aircraft velocity and position may be any of a variety of conventional controls and circuits capable of responding to and guiding aircraft movement.

Obviously, many other modifications and variations of the present invention are possible in light of the above teachings. It is therefore to be understood that within the scope of the appended claims, the invention may be practiced otherwise than as specifically described.

What is claimed is:

1. An aircraft control system for achieving a hover condition comprising:
    means for providing a signal representing aircraft headwind;
    means for providing a signal representing aircraft airspeed in a direction opposite to headwind;
    means for subtracting said signal representing headwind and said signal representing aircraft airspeed, said means for subtracting including,
        means for combining said signal representing headwind and said signal representing airspeed to produce a fade signal, and
        means for combining said fade signal with said signal representing aircraft airspeed to provide an error signal;
    means for controlling said aircraft airspeed in response to said error signal to maintain said error signal at zero.

2. A technique for controlling aircraft velocity to produce zero ground speed of the aircraft comprising:
    providing a signal representing the magnitude of windspeed in a selected direction at the location of an aircraft;
    providing a signal representing the airspeed of said aircraft in a direction opposite to said selected wind direction;
    subtracting said signal representing windspeed from said signal representing airspeed, said subtracting step including, combining said signal representing windpseed with said signal representing airspeed to produce a fade signal, and subtracting said fade signal from said signal representing airspeed to provide an error signal; and controlling the velocity of said aircraft in response to said error signal until said error signal equals zero.

3. The technique of claim 2 wherein said step of providing a signal representing windspeed comprises providing a signal representing headwind.

4. The technique of claim 3 wherein said step of providing a signal representing headwind comprises providing a signal based upon a measurement of headwind at a desired hover site.

5. The technique of claim 3 wherein said step of providing a signal representing headwind comprises computing a value of headwind from information provided by navigational aids and airspeed.

6. The technique of claim 4 wherein said step of providing a signal representing headwind comprises manually providing said signal representing headwind.

7. The technique of claim 3 wherein said step of providing a signal representing airspeed comprises providing a signal representing longitudinal airspeed.

8. In an aircraft control system for controlling the velocity of an aircraft to attain a hover condition at zero ground speed, wherein said system includes means for receiving navigation signals and continuously computing the position of the aircraft with respect to time, means for computing a value for ground speed based on the derivative of aircraft position with respect to time, means for comparing said computed value of ground speed with heading and airspeed information to provide a computed value of windspeed, and means for resolving the computed value for windspeed into headwind and crosswind components, the improvement comprising:

means for subtracting said computed headwind component from longitudinal airspeed, said means for subtracting including, means for combining said computed headwind component with said longitudinal airspeed to produce a fade signal, and means for subtracting said fade signal from said longitudinal airspeed to produce an error signal representative of ground speed; and means for controlling aircraft velocity in response to said error signal representing ground speed so that said error signal goes to zero.

9. An aircraft control system for enabling transition from flight to zero ground speed comprising:

means for receiving a signal representing the magnitude of windspeed in a direction opposite to aircraft movement in the vicinity of an aircraft;

means for receiving a signal representing the magnitude of aircraft airspeed in a direction opposite to said wind direction;

means for combining said signal representing windpseed and said signal representing airspeed said means for combining including, means for combining said signal representing windspeed and said signal representing airspeed to provide a fade signal; and means for subtracting said fade signal from said signal representing airspeed to provide an error signal; and means for controlling aircraft airspeed in response to said error signal to cause the error signal to go to zero.

10. An aircraft control system for enabling transition from flight to zero ground speed comprising:

means for receiving a siganl representing the magnitude of windspeed in a direction opposite to aircraft movement in the vicinity of an aircraft, said means for receiving including means for storing said received signal representing windspeed and providing said received signal as a contact output;

means for receiving a signal representing the mangitude of aircraft airspeed in a direction opposite to said wind direction;

means for combining said signal representing headwind and said signal representing airspeed, said means for combining including, means for subtracting said stored signal representing windspeed and said stored signal representing airspeed to produce a decay signal which decays from a magnitude representing said stored airspeed signal to a magnitude representing said stored windspeed signal, and means for subtracting said decay signal from said received airspeed signal to provide an error signal; and means for controlling said aircraft airspeed in response to said error signal to cause said error signal to go to zero.

11. The system of claim 10 further including means for displaying the magnitude of windspeed represented by said received signal representing windspeed.

12. The sytem of claim 10 further including means for modifying said stored signal representing windspeed to increase or decrease the value of said stored signal and thereby the magnitude of windspeed represented by said stored signal.

13. The system of claim 10 wherein said means for receiving said signal representing airspeed includes means for storing said signal representing airspeed at a selected time.

14. The system of claim 10 wherein said means for subtracting to produce said decay signal further includes means for varying the rate of decay.

* * * * *